United States Patent Office 2,932,572
Patented Apr. 12, 1960

2,932,572

MULTI-TONE SALMON EGGS AND METHODS OF PRODUCING SAME

Steve Sarich, Jr., Seattle, Wash., assignor to Puget Sound Salmon Egg Company, Inc., Seattle, Wash., a corporation of Washington No Drawing. Application May 14, 1957
Serial No. 658,959

20 Claims. (Cl. 99—3)

This invention relates to artificially colored fish eggs and more particularly relates to multi-tone bait salmon eggs wherein the eggs are artificially colored with a first selected color and then partially colored with a second selected color to give a multi-tone effect enhancing the attractiveness, effectiveness and versatility thereof as fish bait.

Conventional practices in hardening and artificially coloring salmon eggs adopt a variety of processing techniques and, manifestly, many variations are available both in the hardening phase and the dyeing phase of the processing. The fish eggs in their natural state are recovered from a fish during the canning process and are usually initially preserved in a sodium chloride solution under refrigeration at 40° to 45° F. until such time as ready for processing. Processing generally involves a hardening treatment such as by steam cooking or by treatment with a hardening agent such as formaldehyde, or both. Sellen U.S. Patent 1,703,324 typifies such processing. Hot salt solutions have also been used to harden or "cure" the eggs, for an example of which practice see Tereski U.S. Patent 2,743,185. The eggs may in addition be subjected to an acid enlargement process, such as disclosed in the pending application of John Thomas Stephan, Ser. No. 467,897, filed November 9, 1954, entitled "Improved Fish Bait." Enlargement techniques involving alkaline treatment are also known.

After hardening with or without enlargement, the eggs are usually also subjected to a dyeing process to give an artificial color thereto and enhance their otherwise generally translucent appearance and may be artificially colored by either any fluorescent or non-fluorescent dye capable of exhausting onto the protein of the egg from aqueous solution. Some typical fluorescent dyes of this character and for this purpose are disclosed in the aforesaid Stephan application and in my pending application Ser. No. 467,893, filed November 9, 1954, entitled "Improved Fish Bait." Coloring the processed eggs with a non-fluorescent dye is likewise typically disclosed in Fishery Leaflet 28 (published by the U.S. Department of Interior, 1946), at pages 17 and 18.

The foregoing typical and therefore incomplete and non-limitive examples of available techniques as to processing bait eggs by hardening, enlargement and artificial coloring thereof, including the typical suitable dyes disclosed in connection with the latter step, serve to illustrate that regardless of the manner of hardening and particular manner of artificial coloring heretofore involved, the dyeing step of the processing has involved the exhausting of but a single selected color onto the egg, with the dye introduced to the eggs in hot aqueous solution as a last step of the hardening and/or enlargement treatment. This is true whether the selected dye is of the non-fluorescent type such as the aniline dyes safrennin or Sherwin Williams 3–R, as disclosed in said Fisheries Leaflet 28, or is of a type having fluorescent or phosphorescent characteristics as disclosed in the aforesaid pending applications of John Thomas Stephan and applicant.

The present invention constitutes an improvement applicable to any and all such processing techniques and provides in the art a procedure for modifying the dyeing step of the treatment to produce eggs multi-tone in color.

According to the present invention a first color, light yellow for example, can be imparted to the egg according to the conventional technique, whereupon the eggs provided with such first color are then removed from the hot aqueous solution and dried for a more or less critical time to the point where they are essentially surface dry but still retain considerable heat from the first dyeing solution. At this point in the processing of the eggs, the eggs are then sprayed with a hot aqueous solution of a dye of a second color, such as dark orange for example, in a manner so that the second dye covers a part only of at least most of the eggs.

According to the essential conditions of treatment according to the present invention, the eggs at the time when they are sprayed with the second dye still retain a considerable amount of the heat just as a chicken egg does when boiled, and this retained heat is utilized to quickly dry the second, sprayed dye solution before "running" of the two colors can occur to any significant extent. If the hot eggs bearing the first color are sprayed too soon, that is before essentially dry to the touch, the two colors will unduly diffuse, i.e. intermingle, and if the eggs are sprayed when too cool similar difficulty will be encountered because slowness in drying of the second, sprayed dye solution will permit "running" thereof.

It has been also determined that it is essential from the point of view of practicability to utilize the lighter of two selected colors as the dye first exhausted onto the processed egg and the darker of the two selected colors as the second dye, applied by spraying. Apparently, this consideration pertains because of the aqueous nature of the processed egg and the aqueous nature of the dyes involved.

The development of multi-tone on fish eggs has proven demonstrably particularly advantageous from a point of view of increasing the effectiveness of the eggs in catching fish, since the multi-tone characteristics of a given egg adapts the egg to a wider variety of fish and underwater light conditions. A constantly changing color pattern is presented by a multi-tone egg as it is passed through the water on a hook which by its very change is more effective in drawing the attention and curiosity of the fish than a colored egg of any given single color would be. An egg which reflects different lights, i.e. colors, in the water is considerably more attractive to the fish and may be compared by analogy with a spoon or spinner with chrome on one side and brass on the other, which is likewise more effective than a spoon or spinner having but a single light reflecting characteristic. Indeed, there is one school of thought among fishermen that change in color is more effective, in terms of attractiveness to fish, than any given color alone and the present invention provides for the first time in the egg type bait field an artificially colored, multi-tone egg.

*Example One*

To demonstrate a typical specific example of the present invention as commercially practiced, unprocessed eggs of a selected type, such as from the king, silver, chum, pink or sockeye salmon, are taken from storage and processed to harden by cooking and enlargement, if desired, the eggs being dyed with a first color as the last step of such processing. The selected first dye color is a light yellow fluorescent such as Brilliant Sulpho Flavine FFA, a sulpho flavine dye manufactured and marketed by General Analine and Film Corporation, New York, N.Y., for example. At the final stage of such treatment the eggs are in hot aqueous solution, and the hot aqueous solution is at boiling temperature (212° F.). The batch of dyed eggs is then removed from aqueous solution and arranged for drying on screened trays, with the eggs being in a single layer or at most at only a few layers in depth. The eggs are then allowed to dry and will of course cool somewhat while drying. After about ten minutes the eggs become essentially dry to the touch and have cooled to approximately 150° F. in temperature, whereupon the second dye in hot aqueous solution is sprayed lightly thereover. The second dye selected, again by way of example, is a dark red fluorescent (cerise) such as Dye C–610, manufactured and marketed by the Shannon Luminous Materials Co., Inc., Hollywood, California. In both instances the dye is mixed in the hot aqueous solution in the ratio of about one quarter ounce of dye per pound of solution.

After such light spraying of the eggs, they are allowed to further dry and the second color solution dries in a matter of a few minutes, about 2 to 5 minutes being typical, the necessary time for the second drying step being dependent on atmospheric temperature and humidity and the quantum of heat retained in the eggs. The eggs after again drying are then packed dry in a sealed container, preferably while still warm. Packing while still warm has the advantage of generating a partial vacuum in the container, it being often very difficult to reheat the eggs without destroying their body, particulary when the eggs have been enlarged.

It will be evident that while the first and second dyes specified above are both fluorescent in character, any other selected dyes, fluorescent or non-fluorescent, capable of exhausting onto the protein of the egg from hot aqueous solution may be used, such as those disclosed in the foregoing pending applications as to fluorescent dyes and those disclosed in Fishery Leaflet 28 as to non-fluorescent dyes, and such as any other dyes suitable for the purpose and otherwise known or available to the art, as desired.

It has been found that in view of the somewhat aqueous nature of the processed eggs and in view of the water solubility of the dyes involved, that the shelf life of multi-tone eggs prepared according to the foregoing example does not exceed some two or three months. While it will be understood that the eggs nevertheless can be so prepared according to Example One if intended for use in a relatively short time, it is nevertheless advantageous to increase the shelf life of the eggs insofar as a multi-tone appearance is concerned beyond the period indicated.

To this end, a modified multi-tone dyeing technique will also be presented by way of further example to show a manner in which the shelf life of multi-tone eggs can be extended.

*Example Two*

In this further example, and utilizing the indicated first yellow fluorescent and second red fluorescent dyes again by way of example, the eggs are processed as before to the point of dyeing in hot aqueous solution with the first dye at a temperature of 212° F. or slightly less. The batch of eggs is then dumped into several screen boxes, say four for example, the layers of the eggs in given screens being about four inches deep. The eggs are left on the screen to drain and dry, the time element involved for this step in the screen boxes varying somewhat with weather conditions of temperature and humidity but generally taking about between ten and twenty minutes after which the eggs are essentially dry to the touch and retain a considerable amount of heat. During the drying phase the temperature of the eggs is reduced to in the range of about 100° to 150° F., it being readily understood that the eggs on the top and bottom of the layer in the screen boxes will of course cool somewhat more than the interior eggs.

Upon becoming essentially dry to the touch, the hot aqueous solution of the second dye solution is lightly sprayed into only part, say two, of the total, say four, screen boxes while the eggs therein are being mixed, i.e. stirred, by hand to bring most of the eggs to the surface for at least a part of the spray time. It will be understood that a few of the eggs in those boxes sprayed will become entirely the red color, that most will be only partially covered by the second dye solution, and that some will not come into contact with the second dye spray at all. The eggs are then left in the screen boxes until the second dye is also dry to the touch, which second drying time is only a matter of about five minutes or even less because the retained heat in the eggs causes the second dye to dry, as before, almost immediately. After the eggs in the two sprayed boxes are again dry, the eggs in all the screen boxes are intermixed and, as before, immediately dry packed in sealed containers while still warm, the retained heat providing a vacuum seal of about six to eight inches pressure (Hg) in the sealed "pack."

Eggs dyed and packed according to this latter technique generally exhibit the following characteristics with respect to color, a few of the eggs are entirely the dark or second color, slightly less than half of the eggs are multi-tone in varying proportions of the darker and lighter color, and slightly more than half of the eggs are entirely of the lighter color. In view of the previously indicated generally aqueous nature of the egg interior and water solubility of the dyes involved, however, it has been found in storage that the darker eggs or egg portions will tend to spread slightly and progressively onto the lighter eggs or egg portions. Thus, a given egg which is entirely light in color, if in contact in the pack with an egg having a darker color portion, will develop a darker colored spot at such point of contact. Correspondingly, eggs predominately dark in color will tend to gradually become entirely dark during extended storage, but the net result is that after extended storage for even a year or more the "pack" will continue to have at least some eggs colored in one part with the lighter color and colored at another part with the darker color.

Further, from the commercial point of view, handling of the eggs during the second, spray dyeing phase in relatively large quantities, such as in Example Two is considerably better also in that much higher volume production per man hour can be attained as compared with spraying the eggs in single layers or a few layers.

While both of the foregoing examples have involved batch treatment of the eggs, continuous processing techniques involving basically the same procedures will readily occur to those skilled in the art, such as lightly and continuously or intermittently spraying the first-dyed and dried eggs from one side while the eggs move in a shallow layer along a moving screen, belt or drum, for example.

Further examples of practice of the present invention by use of fluorescent dyes include fluorescein, Shannon C–213 Invisible Blue Fluorescent Dye, Shannon C–416 Green - Yellow Fluorescent Dye or Shannon C–603 Orange-Red Fluorescent Dye as the first dye and the aforementioned Shannon C–610 or eosin, azo-eosin, rhodamine or pyronine as the second dye, as desired.

The practice of the present invention has been also demonstrated by utilization of a non-fluorescent dye such as Ciba Scarlet 4–R, a naphthylamine dye manufactured by the Ciba Dye Co., San Francisco, California, as the second dye. However, it has been determined that when fluorescent dye characteristics are desired in the eggs, it is not as effective to use a non-fluorescent as the second dye because the non-fluorescent second dye tends to mask the fluorescent first dye to a considerable extent and redue the effectiveness thereof.

Generally as to the particular lighter first dye and darker second dye selected for use in a particular area and at a particular season of the year, and while fluorescent dyes respectively light yellow and dark red as set forth in the foregoing examples have been found particularly effective for fresh water lake and stream fishing in the Pacific Northwest area, it will be readily understood that the present invention is equally applicable to any selected pair of the many non-fluorescent and fluorescent dyes available to the art for artificially coloring bait eggs by hot aqueous treatment. Thus, it will be evident that the present invention is concerned with multi-tone bait eggs and the particular technique for developing durable multi-tones on processed bait eggs, and is not critically concerned with the particular dyes employed in practice of the invention.

While only two stages of dyeing and a two-tone bait egg product have been disclosed in the foregoing examples, multi-toning with three or more dyes is readily within the capability of the present invention, the additional color or colors being applied in the same manner as the second color in the examples as a subsequent step or steps and utilizing the essentially dry character and retained heat of the eggs to minimize diffusion and promote rapid drying of the additional colors, as before.

Other variations and manifestations of the invention by utilization of any selected lighter and darker dye for the multitone effect herein contemplated will readily occur to those skilled in the art, within the scope of the following claims.

What is claimed is:

1. A multi-tone bait fish egg, artificially colored with a first, lighter color as to a substantial portion thereof and artifically colored with a second, substantially darker color as to another substantial portion thereof, the said first and second artificial colors imparting an enhanced attractiveness, effectiveness and versatility to the egg when used as fish bait.

2. A multi-tone bait egg of the character set forth in claim 1, wherein the egg is a hardened salmon egg.

3. A multi-tone bait egg of the character set forth in claim 1, wherein the egg is a hardened salmon egg, said lighter color is a light yellow and said second color is a dark red.

4. A multi-tone egg of the character set forth in claim 3, wherein said first and second colors are characterized by fluorescence.

5. A multi-tone bait salmon egg having a first water soluble dye exhausted onto a portion thereof and a second water soluble dye exhausted onto another portion thereof, said second dye being substantially darker than said first dye, the said egg portions thereby having substantially different light reflective characteristics.

6. A bait egg pack comprising artificially colored bait salmon eggs, at least most of the eggs in said pack each having at least two distinct, artificially colored portions of respectively substantially different light reflective characteristics.

7. A bait egg pack according to claim 6, wherein the eggs are each colored as to a portion with a light yellow dye and colored as to another portion with a dark red dye.

8. A bait egg pack according to claim 7, especially suited for fresh water lake and stream fishing, wherein said light yellow dye is Brilliant Sulpho Flavine FFA and said dark red dye is Shannon C-610.

9. A bait salmon egg pack according to claim 6, packed dry under partial vacuum in a sealed container.

10. A bait salmon egg pack comprising multi-tone salmon eggs, colored in the following proportions when packed; about half entirely with a light colored water soluble dye, a small proportion entirely with a substantially darker colored water soluble dye and the balance essentially colored with said light colored dye as to a portion of each and colored with a such substantially darker colored dye as to another portion of each, the various types of eggs being thoroughly intermingled in said pack.

11. A bait fish egg pack according to claim 10, packed dry under partial vacuum in a sealed container.

12. A bait fish egg pack according to claim 11, exhibiting a shelf life of at least a year in terms of availability of at least some bait eggs having more than one color characteristic.

13. A bait egg pack according to claim 10, wherein the eggs are each colored as to a portion with a light yellow dye and colored as to another portion with a dark red dye.

14. A bait egg pack according to claim 13, especially suited for fresh water lake and stream fishing, wherein said light yellow dye is Brilliant Sulpho Flavine FFA and said dark red dye is Shannon C-610.

15. A method of artificially coloring processed fish eggs for use as bait comprising applying a first lighter color dye in hot aqueous solution thereto in connection with the final stage of processing of said eggs, arranging the eggs in a shallow layer, drying the eggs to the point where they are substantially dry to the touch, spray coating an aqueous solution of a second, darker color dye on a part only of the surface of at least some of the eggs, and again allowing the eggs to dry while utilizing the retained heat in the eggs to expedite the second drying step.

16. A method of artificially coloring fish eggs for use as bait, comprising introducing a first, lighter dye to the eggs in hot aqueous solution in connection with the final phase of hardening thereof, removing the eggs from the said hot aqueous dye solution and arranging the eggs in a shallow layer for drying, drying the eggs to the point where they are substantially dry to the touch and retain a considerable degree of the heat they have derived from said hot aqueous solution, and immediately thereafter spraying a portion of the surface of at least some of the eggs with a second, darker dye in aqueous solution.

17. A method according to claim 16, wherein the concentration of the dye in aqueous solution in each instance is about one quarter ounce dry weight of dye per pound of solution.

18. A method of artificially coloring bait salmon eggs, comprising introducing a first, lighter dye to the eggs in hot aqueous solution at about 212° F. in connection with the final phase of hardening thereof, removing the eggs from the said hot aqueous dye solution and arranging the eggs in shallow layers for drying, such layers being only a few eggs deep at the most, drying the eggs for about 10–15 minutes to the point where they are substantially dry to the touch and have cooled to about 150° F. but retain a considerable degree of the heat they have derived from said hot aqueous solution, immediately thereafter spraying a portion of the surface of at least some of the eggs with a second, darker dye in hot aqueous solution, and again drying the eggs for about 2–5 minutes to the point where they are again substantially dry to the touch, and dry packing said eggs in sealed containers while still warm.

19. A method of artificially coloring bait salmon eggs, comprising introducing a first, lighter dye to the eggs in hot aqueous solution at about 212° F. in connection with the final phase of hardening thereof, removing the eggs from the said hot aqueous dye solution and separating the eggs for drying on a plurality of screens so that the eggs are in shallow layers only a few inches deep at most, drying the eggs for about 10–20 minutes to the point where they are substantially dry to the touch and have cooled to about 100°–150° F. but retain a considerable degree of the heat they have derived from said hot aqueous solution, immediately thereafter spraying the eggs in only part of the screen boxes with a second, darker dye in hot aqueous solution while simultaneously mixing the eggs therein to coat the eggs with a second darker dye solution completely as to some, partially as to most and not at all as to some, again drying the eggs so sprayed for about 5 minutes to the point where they are again substantially dry to the touch, thoroughly remixing the eggs subjected to the second dyeing step with the balance of the eggs dyed only with the first dye, and dry packing the remixed eggs in sealed containers while still warm.

20. A bait fish egg having a distinctive two-tone, artificially imparted coloring pattern, including a first surface area having the light reflective characteristics of a light color, and a second surface area having the light reflecting characteristics of a contrasting color.

References Cited in the file of this patent

FOREIGN PATENTS 741,246   France _____ 1933

OTHER REFERENCES

Fishery Bulletin, 28, U.S. Dept. of Interior, September 1946, pp. 17–18.